Dec. 10, 1946.   R. C. KIVLEY   2,412,458
TOOL GUIDING FIXTURE
Filed Nov. 6, 1943   2 Sheets-Sheet 1

INVENTOR.
R. C. KIVLEY
BY
ATTORNEY

Dec. 10, 1946.                R. C. KIVLEY                 2,412,458
                         TOOL-GUIDING FIXTURE
                        Filed Nov. 6, 1943           2 Sheets-Sheet 2

INVENTOR.
R. C. KIVLEY
BY
*Harry L. Duft*
ATTORNEY

Patented Dec. 10, 1946

2,412,458

UNITED STATES PATENT OFFICE 2,412,458

TOOL GUIDING FIXTURE

Ray C. Kivley, Oak Park, Ill., assignor to Western Electric Company, Incorporated, New York, N. Y., a corporation of New York.

Application November 6, 1943, Serial No. 509,165

4 Claims. (Cl. 77—62)

This invention relates to tool guiding fixtures and more particularly to a combined template and tool jig.

An object of the present invention is the provision of a practicable combined template and tool jig for facilitating the locating of points to be worked in a face of a part in definite and uniform relation to the contour of the part so that the contours of similar parts, likewise worked, will be accurately aligned when secured together.

In accordance with the above object, in one embodiment of the invention, particularly designed for use in drilling apertures in flanges of tubular parts of rectangular contour, there is provided a template, which rests on the part and has apertures corresponding in arrangement to the apertures to be drilled. Depending centrally from the template and freely receivable in the bore of the part is an extension in which is slidably carried a plurality of sets of positioning and clamping pins arranged to engage angularly disposed faces at each corner of the bore, one set of pins being in a different vertical plane than the other sets of pins and the pins of each set being movable in opposite directions. Each set of pins is simultaneously advanced outwardly by a spring-actuated cam member individual thereto, which permits the various sets of pins to move different distances, the cam members being simultaneously withdrawn and/or released by a common control member actuated from a point above the template. The pins are retracted from the faces of the bore upon withdrawal of the cam members by individual springs connected to each set thereof. Thus, by releasing the spring-actuated cam members, the sets of pins are simultaneously advanced to engage the faces of the bore of the part and due to the resultant equalizing action set up between the sets of pins, the template is centered with the bore and the jig clamped to the part.

Other objects and advantages of this invention will more fully appear from the following detailed description, taken in conjunction with the accompanying drawings, in which Fig. 1 is a fragmentary plan view of a combined template and drill jig embodying the features of the invention;

Figure 1:
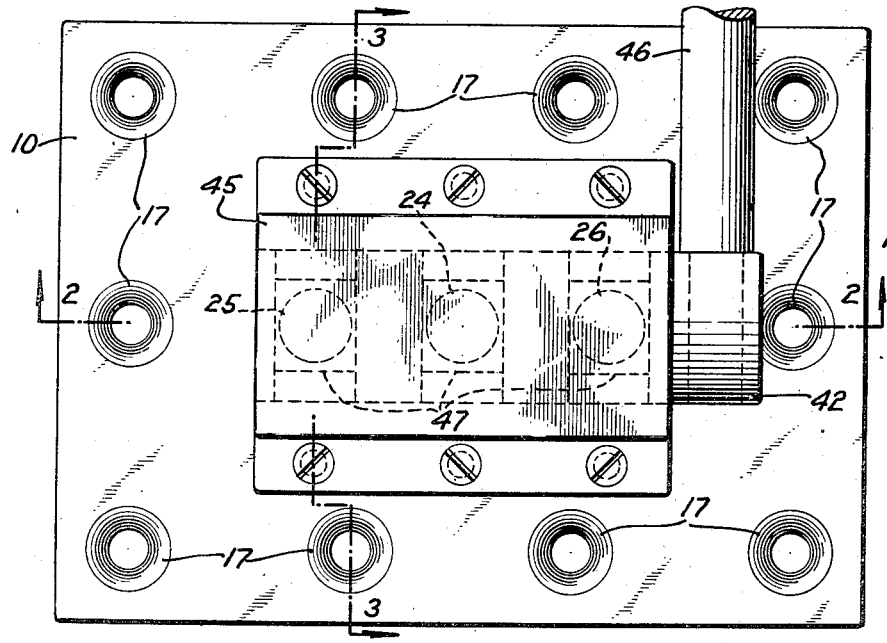
Figure 2:
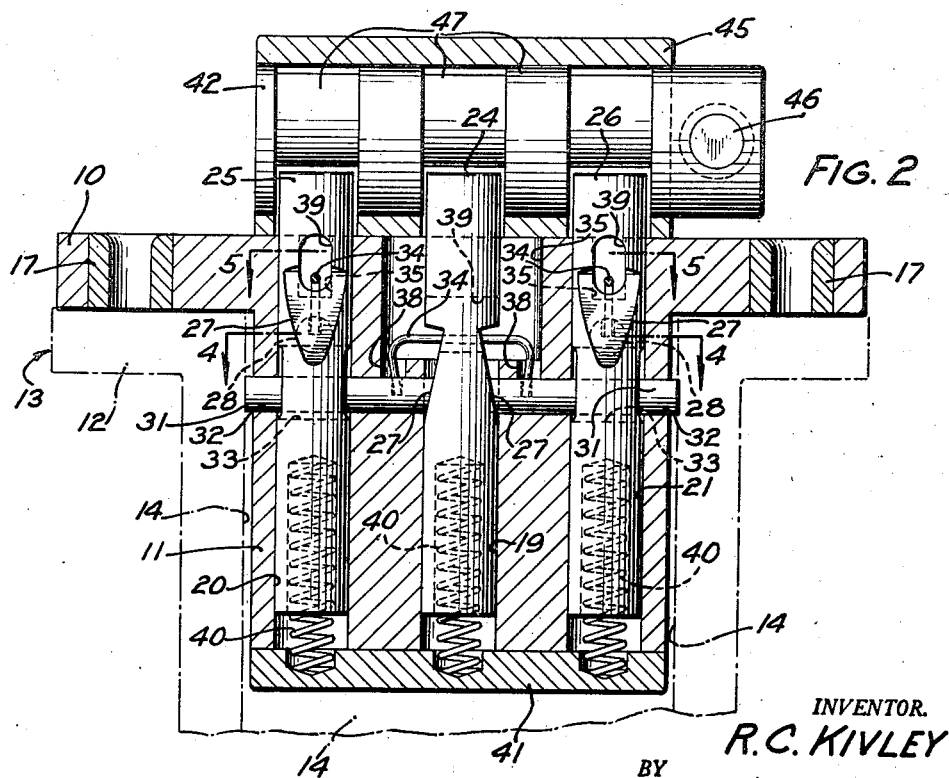
Fig. 2 is a central longitudinal vertical section taken on the line 2—2 of Fig. 1 showing the jig in operative position upon a part to be drilled.
Figure 4:
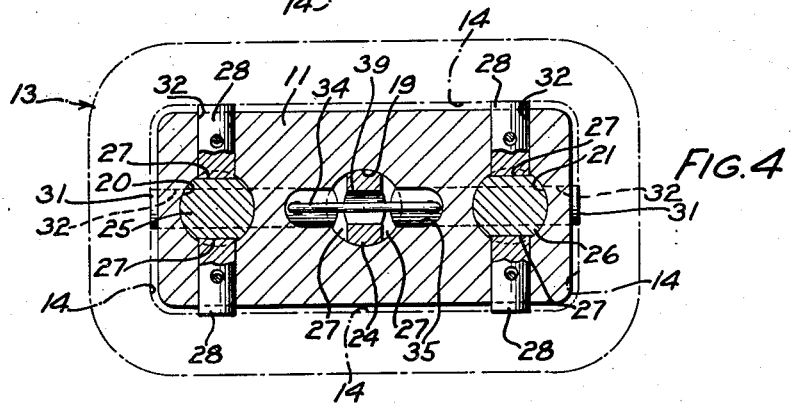
Figure 5:
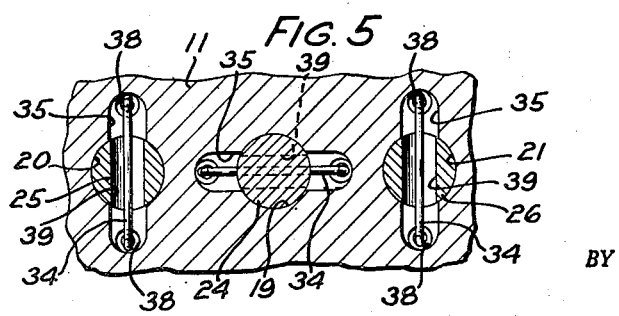

Figs. 4 and 5 are plan sections taken on the lines 4—4 and 5—5, respectively, of Fig. 2.

Figure 3:
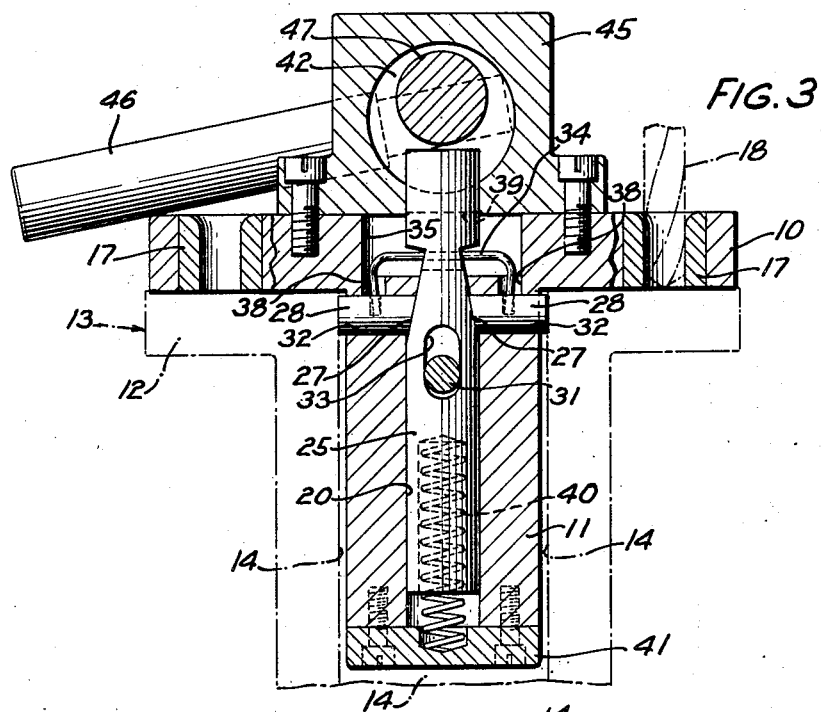
Fig. 3 is a vertical irregular section taken on the line 3—3 of Fig. 1.

Referring to the drawings, particularly to Figs. 2 and 3, a template of rectangular contour is indicated at 10 having an integral depending centralized portion 11, the template being used in drilling a series of apertures in an outer end face of a flange 12 of a tubular part 13 of rectangular cross section, which is indicated fragmentarily in broken outline. In the use of such tubular parts 13, which are abutted at their drilled flanges and secured by bolts, it is essential that, in some applications thereof, the inner contours of the parts formed by the walls 14 should be accurately and micrometrically aligned. Therefore, it is necessary that the drilled flange apertures of each part should have a definite and uniform relation to the inner contour thereof. Formed in the template 10 are a series of apertures, in which are drive-fitted hardened bushings 17 which serve to guide drills, one of which is shown fragmentarily in broken outline at 18 (Fig. 3), into engagement with the flange during the drilling operation. After the template 10 is accurately positioned upon the flange 12 and clamped to the part 13 by means carried by the template portion 11, and in a manner which will now be described, the points of the flange 12 to be drilled are definitely located relative to the inner contour of the part.

Longitudinally slidable in vertical apertures 19, 20 and 21 formed in the template 10 and depending portion 11 are cam members 24, 25 and 26, which are centrally arranged in a row extending longitudinally of the template. Intermediate their ends the cam members are notched upon opposite sides to provide inclined cam faces 27, the cam faces of the member 24 being at a lower level than the cam faces of the members 25 and 26 and disposed 90° therefrom to face the narrower inner end walls 14 of the tubular plate 13 while the cam faces 27 of the members 25 and 26 face the longer walls thereof (Fig. 4). Engaging each of the cam faces 27 of the members 25 and 26 are template positioning and clamping pins 28 and engaging the cam faces 27 of the member 24 are pins 31 for a similar purpose, the pins at their inner end faces being inclined to match the inclined cam faces. The pins 28 and 31 are slidable in suitably arranged apertures 32 in the template 10 and its depending portion 11 and the pins 31 extend freely through elongated apertures 33 (Figs. 2 and 3) in the cam members 25 and 26 so that each cam member may actuate its associated pins without interference. Operatively connected to each pair of pins 28 and 31 is a U-shaped spring 34, having inclined opposite arms entered in suitable depressions in the pins, the springs being constantly effective to maintain the pins in engagement with the cam faces 27 of the members 24, 25 and 26. At their upper ends, the apertures 19, 20 and 21 are suitably enlarged, as indicated at 35 (Fig. 3) and apertures 38 are provided in the template 10 and its depending portion 11 for the mounting of the springs 34. The cam members 24, 25 and 26 are slotted at 39 for receiving the springs 34.

Each of the cam members 24, 25 and 26 is normally individually urged upwardly to cam their associated pins 28 and 31 outwardly to their operative positions, as shown (Figs. 2, 3 and 4), with their outer end faces engaging the walls 14 of the tubular part 13 by compression springs 40, the springs being retained at opposite ends in depressions in the cam members and in depressions in a plate 41 secured to the bottom face of the depending portion 11 of the template. To effect a withdrawal of the pins 28 and 31 from the walls 14, the cam members 24, 25 and 26 are moved downwardly by a rotatable multiple eccentric member 42 journalled in a box 45 attached to the upper face of the template 10, a handle 46 fixed to an end of the eccentric member providing means for rotating the member. The member 42 is formed with three similar and aligned eccentric portions 47 arranged above the upper end faces of the cam members 24, 25 and 26. With the handle 46 in the position shown in Fig. 3, the eccentric portions 47 have been rotated to their upper positions and are out of contact with the end faces of the spring advanced cam members 24, 25 and 26. To lower the cam members 24, 25 and 26, the handle 46 is merely rocked from the left to the right hand side of the box 45, whereupon the eccentric portions 47 engage the cam members and simultaneously cam them downwardly and, as the cam faces 27 move downwardly, the engaged positioning and clamping pins 28 and 31 are simultaneously drawn inwardly from the walls 14 of the part 13 by the action of the springs 34 until their outer end faces lie substantially flush with the outer vertical faces of the depending portion 11 of the template 10.

In the use of the combined template and drill jig above described, and assuming that the handle 46 is at the right hand side of the box 45 with the positioning and clamping pins 28 and 31 in their retracted position, as last described, the jig is mounted on the flange 12 of a tubular part 13 and the handle is rotated to the left hand side of the box 45, as shown in Fig. 3. This last movement of the handle 46 simultaneously releases the spring-actuated cam members 24, 25 and 26 and, as they move upwardly, each cams outwardly its associated pair of pins 28 and 31, each pair of pins being simultaneously advanced to engage the walls 14 of the part 13 and, depending on the inner contour of the tubular part 13, may move varying distances, the associated pins of each pair advancing a similar distance. Any variation in the distance advanced between the various pairs of pins will be micrometric, but due to the resultant equalizing action set up between the pairs of pins, the template 10, which is free to move on the flange 12 of the tubular part 13, will be centered relative to the inner contour of the part determined by the relative positions of the walls 14 and clamped thereto by the action of the spring-actuated cam members 24, 25 and 26, pressing outwardly upon the pins 28 and 31. As thus positioned and clamped on the flange 12 of the part 13, drills, such as indicated at 18, may be guided into the bushings 17 carried in the template 10 to form apertures in the flange in definite and uniform relation to the inner contour of the part. Thus, when similar parts 13 are drilled in a like manner with the use of the template 10, the inner walls 14 will be accurately aligned when secured together by bolts entered in the drilled apertures.

It will be understood that the embodiment herein described is merely illustrative of the invention and one application thereof and that modifications can be made and it is capable of other applications.

What is claimed is:

1. A combined template and drill jig for use in locating points to be drilled in an end face of a tubular part relative to the bore thereof comprising a template for mounting on an end face of a part, said template having apertures corresponding in arrangement to the points to be drilled, means depending from said template adapted to freely enter the bore of the part, a plurality of sets of elements movable on said means to engage angularly disposed faces of the bore, an individual member for moving each set of elements, said members being laterally spaced apart and movable simultaneously in the same direction, and means including a common actuator for simultaneously moving said members and thereby said elements of each set like distances effective to predeterminedly position the jig relative to the faces of the bore and clamp the same to the part.

2. A combined template and drill jig for use in locating points to be drilled in an end face of a tubular part relative to the bore thereof comprising a template for engaging an end face of a part, said template having apertures corresponding in arrangement to the points of drilling, a plurality of positioning and clamping pins reciprocably carried on said template for freely entering the bore of the part, said pins being arranged in sets for engaging angularly disposed faces of the bore, individual spring actuated cams arranged to directly engage and advance each set of pins, and a common control member effective to simultaneously release said cams to permit said set of pins, upon being advanced, to centralize the jig relative to the bore and clamp the the same to the part.

3. A combined template and drill jig for guiding a drill toward a part to be drilled comprising a body for engaging a face of a part, said body having apertures corresponding in arrangement to the points of drilling, a plurality of spring retracted jig-positioning members carried by said body arranged in pairs for engaging different angularly disposed faces of the part to be drilled, an individual plunger for simultaneously actuating each pair of said members, rotary cam means individual to each of said plungers for simultaneously positively withdrawing said plungers from their actuated positions and for releasing the same, a common actuator for said rotary cam means, and a spring individual to each plunger for actuating the same whereby each plunger and its associated pair of members may be moved varying distances and their combined movements equalized in accordance with the shape of the part to be drilled.

4. A combined template and drill jig for guiding a drill toward an end face of a tubular part to be drilled at points definitely and uniformly related to the bore contour of the part comprising a template for mounting on an end face of the part, said template having apertures corresponding in arrangement to the points of drilling, a portion depending from and centralized with said template arranged to freely enter the bore of the part, a plurality of members carried in said portion and arranged in pairs for engaging angularly disposed faces of the bore, an individual cam-faced plunger for simultaneously actuating the members of each pair, means common to said plungers for positively withdrawing said plungers from their actuated positions and for releasing the same, and a spring individual to each plunger for actuating the same whereby each plunger and its associated pair of members may be moved varying distances in accordance with the contour of the bore of the part and thus predeterminedly position the template relative thereto.

RAY C. KIVLEY.